(12) United States Patent
Castronovo

(10) Patent No.: US 6,334,582 B1
(45) Date of Patent: Jan. 1, 2002

(54) HIGH-SECURITY CD DISK ERASURE PROCESS, AND PORTABLE MACHINE FOR ACCOMPLISHING HIGH-SPEED, HIGH-SECURITY CD DISK ERASURE

(76) Inventor: Charles A. Castronovo, 706 Chapel Ridge Rd., Timonium, MD (US) 21093

( * ) Notice: Subject to any disclaimer, the term of this patent is extended or adjusted under 35 U.S.C. 154(b) by 0 days.

(21) Appl. No.: 09/516,934

(22) Filed: Mar. 1, 2000

(51) Int. Cl.[7] .................................................. B02C 19/12
(52) U.S. Cl. ........................ 241/29; 241/30; 241/260.1; 241/279
(58) Field of Search ................................. 241/260.1, 277, 241/279, 30, 24.18, 18, 19, 29; 101/4, 7

(56) References Cited

U.S. PATENT DOCUMENTS 2,265,649 A * 12/1941 Krehbiel .................... 241/260.1
4,509,700 A * 4/1985 Svengren ................... 241/260.1
5,954,569 A    9/1999 Hutchison et al.
6,039,637 A    3/2000 Hutchison et al.
6,189,446 B1   2/2001 Olliges et al.

OTHER PUBLICATIONS

Proton Engineering Inc. literature, Jul. 22, 1999.
DX–CDm™ Destruction Device literature, undated.
DX–Cde CD Destruction Device literature, undated.

* cited by examiner

Primary Examiner—Mark Rosenbaum
(74) Attorney, Agent, or Firm—McGuire Woods LLP

(57) ABSTRACT

The data destruction machine is a desk-top, portable unit with a short (under 10 second) cycle time, pluggable into a wall outlet. Upon insertion of a CD into the machine, which is fully automatic, data is erased, and the cleaned CD is ejected. The machine converts the data-storage layer into residue consistent with security destruction standards from which no data is retrievable.

40 Claims, 11 Drawing Sheets

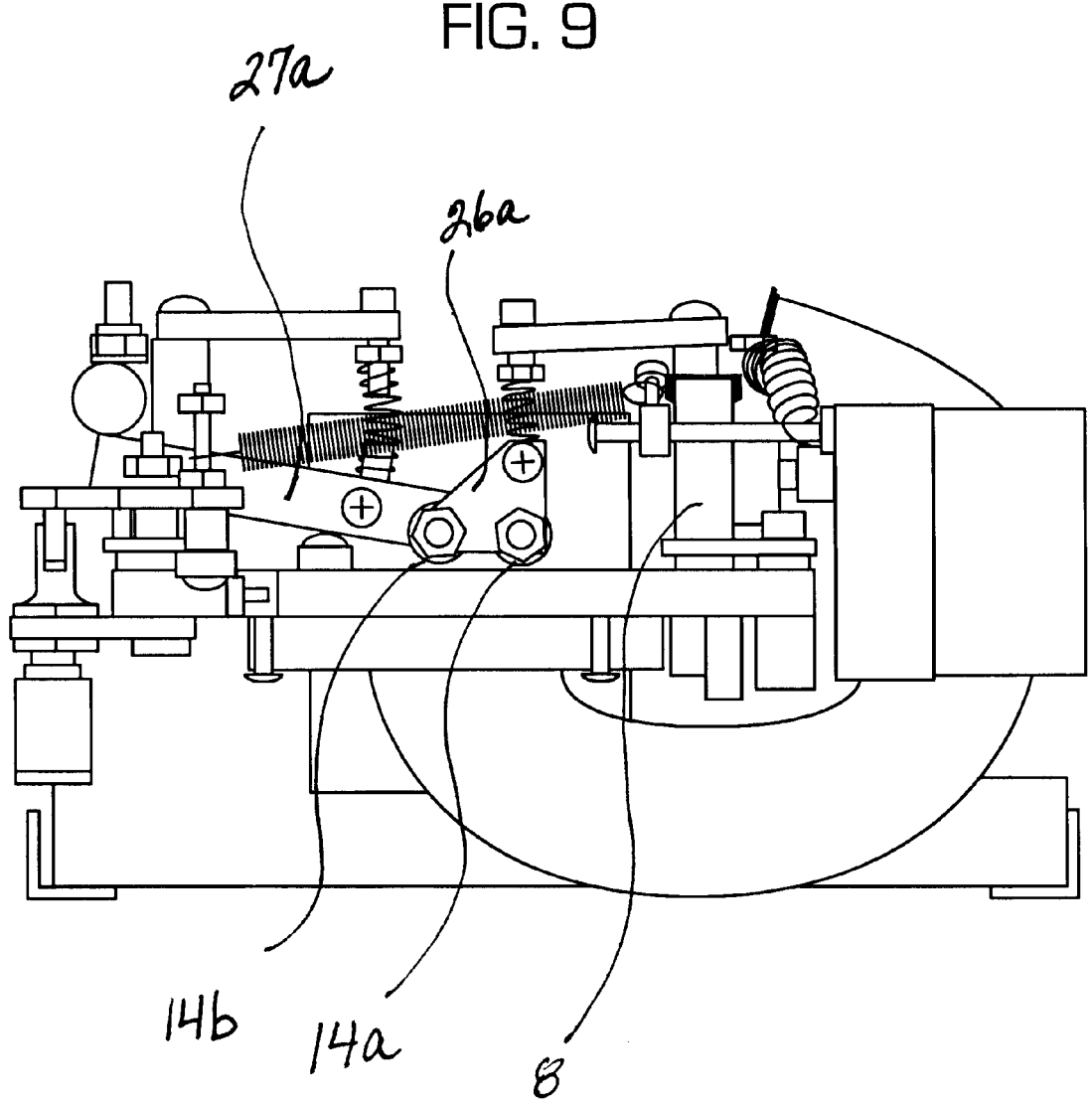

HIGH-SECURITY CD DISK ERASURE PROCESS, AND PORTABLE MACHINE FOR ACCOMPLISHING HIGH-SPEED, HIGH-SECURITY CD DISK ERASURE

FIELD OF THE INVENTION

This invention relates to high-security erasure of ordinary CD disks, CDRs and CDRWs.

BACKGROUND OF THE INVENTION

CD disks include three types: ordinary CD disks, CDRs and CDRWs. These disks store data in little pits burned into a CD ROM. The information is stored in a very thin layer under the label. That stored information theoretically can be scraped off into enough pieces so that the data cannot be read. That is, the data can be mechanically disintegrated.

CDRs are also known as WORMs, i.e., Write Once Read Many. Relatively speaking, for different kinds of CD disks, deletion or erasure of data from CDRs is the most difficult to accomplish.

CDRWs are the modern equivalent of floppy disks. Actual writing is by a laser, and the stored data is covered by a metallized reflective layer which is the label. Rewriteables tend to have data come off in flakes. Also, the mirror image could come off onto the label. Flakes are big enough fragments that data can still be read.

Destruction of data from these three general categories of disks may be further complicated by the fact that particular manufacturers may use different adhesive systems, with some systems more prone to flaking upon grinding off the data. Thus, flaking is a variable problem for which provision must be made, but which is not easily solved, when undertaking data removal by grinding.

In certain applications, erasing or removing sensitive data from disks can be critical for security reasons or necessary for business reasons. As devices for putting information onto CD disks are becoming more common, so, too, the problem of how to effectively remove that stored information from the disks is becoming even more of a concern.

Certain devices for performing such data erasure are known, but respectively suffer from drawbacks.

For example, Proton Engineering Inc. has a declassification system that is a CD-ROM Eraser/Declassifier, for CD-ROMS, WORM CDs and other optical media, that according to its literature reportedly declassifies CD-ROMS in 12 seconds. It is a mini-tower of 18"×18"×9", 75 lbs, and its power requirements are 120 vac. 50/60 Hz., 8 amperes.

Another example of a known data-erasure device is SEM's model 1200 weighing 75 lbs.

The DX-CDe CD destruction device is 59.4 lbs, 24" high, 7.5" in diameter, with electrical operation.

These declassification machines, weighing 75 lbs, almost 60 lbs and 50 lbs, disadvantageously are relatively heavy and not easily portable.

A further example is the DX-CDm™ CD Destruction Device, which is a manual field portable unit that is intended for mounting on the inside wall of a vehicle, bracketed to the side of a vessel, or securely fastened to the bulkhead of an ocean going vessel. The machine is 20 lbs, 10 high, of 7" diameter. The inner hub of the erased disk remains intact. The machine operates by mechanical operation with a rotating handle. An optional motor drive is included. Although this declassification machine is relatively light-weight, 30 seconds is the operating time, which may be disadvantageously long.

Another consideration introduced into this data destruction area is that in many applications the declassified disk cannot be entirely destroyed, because verification of declassification is needed for the particular exact original disk. Such verification is accomplished by a data destruction method that retains only the disk's inner-hub which bears its identifying information, such as a serial number. A method which destroys the entire disk does not permit this verification of destruction.

There is a need, which has not heretofore been met, for a data erasure machine that declassifies CD disks that meets the following characteristics: short (e.g., less than 10 seconds) cycle time; small size (e.g., such as 10×12×8 inches); pluggable into a wall outlet; light-weight (e.g., less than about 20 lbs); mechanically simple; and, capable of destroying all confidential data on the disk while maintaining intact only the inner hub of the disk, so that the serial number or identifying disk number remains visible to confirm data destruction on the original product.

SUMMARY OF THE INVENTION

After much evaluation by the inventor of potential ways to remove and handle stored material on CD disks, including evaluating cutting, grinding and destroying the whole disk, the present inventor arrived at the following inventive products for removing data from disks while leaving the inner-hub data intact and further arrived at the following inventive methods and machines.

The invention provides a method for security declassification of a disk, comprising the step of contacting a data-containing disk with a rotating cutter having a patterned surface to provide a declassified disk. In one embodiment, the contacting step provides dust. In another embodiment, the contacting step provides dust and flakes. A preferred embodiment of the invention, further comprises grinding the flakes into dust.

In a preferred embodiment, the invention provides a method wherein the declassified disk has an intact center ring. In one embodiment, the intact center ring comprises disk identifying information.

In a preferred embodiment, an inventive method wherein the cutter is cylindrical shaped is provided.

The invention provides a method wherein cutter rotation is provided by a motor.

The invention provides a method wherein the patterned cutter surface comprises a pattern selected from the group consisting of a rotary file, herring bone, cross-cut rotary file, intersecting spiral and non-cross-cut interleave file. In a preferred embodiment, the pattern is cross-cut herringbone.

In a preferred embodiment, the invention provides that the cutter has diameter about ½ inch.

The invention further provides a method wherein the cutter has a length equal to or about corresponding to an exterior data band of the disk. In a preferred embodiment, the cutter length exceeds the exterior data band.

The invention provides that in one embodiment, the cutter is operated at about 10,000–30,000 rpm.

In another embodiment, the disk is rotating while the cutter is contacting the disk.

In another embodiment, the contacting step is performed for about 3–10 seconds.

The invention provides for a method wherein a disk is declassified in as little as 3–6 seconds, to provide products consisting essentially of a declassified disk with intact center-ring and security-standard dust.

In one embodiment, the cutter is driven by a motor run on a timing cycle.

In a further embodiment, the timing cycle is initiated by an arm-actuated microswitch.

The invention provides an embodiment wherein the microswitch is triggered by the disk before the contacting step.

The invention provides a preferred embodiment which is a method further comprising the step of vacuum-collecting the dust.

In another embodiment, the inventive method further comprises capturing the flakes. In a preferred embodiment, flake capturing comprises providing a screen disposed near the rotating patterned cutter. In a most preferred embodiment, the invention further comprises grinding the captured flakes into dust.

The invention provides a method wherein the products consist essentially of a declassified disk with an intact center ring and dust.

The invention includes a method wherein the rotating cutter is provided in a desk-top, portable machine pluggable into a wall outlet.

The invention includes embodiments wherein the disk is an ordinary CD disk, a CDR and a CDRW, etc.

In one embodiment, a vacuum system is applied to hold the disk in contact with the rotating cutter having a patterned surface. In a further embodiment, the disk is held in contact with the patterned cutter surface entirely by the vacuum system.

Additionally, the invention provides a high-security, high-speed disk declassification machine, comprising a patterned-surface cutter, wherein the cutter is of length about corresponding to the exterior data band of a disk; a motor connected to the cutter for rotating the patterned-surface cutter at 10,000–30,000 rpm; and a system for capturing and positioning the disk to press the rotating patterned-surface cutter parallel to the disk with the cutter length aligned with a disk external data radius for sweeping the disk external data surface.

In one embodiment, the inventive machine weighs about 17 pounds.

In a preferred embodiment, the invention provides a machine measuring about 8 inches high by 10 inches long by 12 inches wide.

In one embodiment, the invention provides a machine wherein the cutter-driving motor is on a timing cycle controlled by a microswitch, wherein the cycle is triggered on by a disk being inserted past the microswitch's actuator arm.

In another embodiment, the invention provides a machine wherein the system for capturing and positioning the disk comprises a spring-loaded pinch roller. In a further embodiment, the pinch roller comprises a pinch roller (driven by a motor), squeezing the disk against a ball bearing.

The invention provides a machine wherein the system for capturing and positioning the disk comprises a means for rotating the disk being declassified. Also, the invention includes a machine wherein the means for rotating the disk being declassified comprises a roller mechanism.

Additionally, in another embodiment the invention provides a machine wherein the system for capturing and positioning the disk comprises ball bearings against which the disk to be declassified rests. A preferred embodiment positions three ball bearings in a triangle with one ball bearing positioned on a pressure arm which captures the disk to position for holding and rotating.

The invention also provides a machine wherein the system for capturing and positioning the disk comprises a pivot with a non-rotating guidepost at the bottom of the pivot, wherein the guidepost is located exactly across from the center of the roller.

A preferred embodiment of the invention provides a machine further comprising a brush for brushing the pinch roller.

In one embodiment of the invention, the pinch roller is easily replaceable.

In another embodiment, the invention provides for the machine to further comprise a dust collection system for collecting dust formed when the cutter contacts the disk. In a preferred embodiment, the dust collection system comprises a vacuuming system positioned near the cutter and a dust collection bag connected to the vacuuming system.

The invention provides a machine further comprising a means for flake collection disposed near the cutter. In a preferred embodiment, the means for flake collection comprises a screen.

In a preferred embodiment, the invention provides a machine wherein the cutter is cylindrical.

In one embodiment, the invention provides a data declassification machine comprising a multi-disk processing system.

The invention also provides a production method for minimizing the size and weight of a high-speed CD-disk declassification motorized machine to as small as about 8 inches by 10 inches by 12 inches and as light as about 17 pounds, comprising the steps of: (A) providing a housing of about 8 inches high, with a base of about 10 by 12 inches, and having an opening on a side into which a CD disk may be inserted; (B) in the housing interior, securely disposing a system for capturing and positioning a CD disk, such that the capturing/positioning system is secured to the housing base; CC) mechanically connecting to the capturing/positioning system, a system for disposing a patterned-surface cutter of length about 1.52 inches with the cutter parallel to and below where the CD disk will be held by the capturing/positioning system for grinding, with the cutter length aligned with the CD exterior data band radial width; (D) to the cutter, connecting a motor for rotating cutter at 10,000–30,000 rpm; and (E) connecting a power cord to the cutter motor for establishing connection as needed to an external power source.

The most preferred embodiment of such a production method provides a CD disk declassification machine that outputs a verifiable center-ring-intact declassified CD disk.

In one embodiment of the inventive production method, the CD disk capturing/positioning system comprises a platform of about 6 inches wide by 5½ inches long for supporting the CD disk during high-speeding grinding. The platform has a minimized cut-out section for the cutter under the disk to contact the CD disk data surface.

A particularly preferred embodiment provides for (1) disposing a microswitch system comprising a microswitch such that the microswitch is positioned with respect to the opening into which the CD disk is inserted to detect entry of a CD disk into the housing; and (2) electrically connecting the microswitch to a timing circuit and disposing the timing circuitry in the housing interior.

Another preferred embodiment provides for disposing a motorized vacuum dust collection system in the housing interior. The motorized vacuum dust collection system may comprise a motor separate from the cutter motor. The motorized vacuum dust collection system may comprise a dust collection bag connected to a vacuum exhaust which is connected to a vacuuming device directed to vacuum dust from where the cutter contacts the CD disk.

In another embodiment, the invention provides for the capturing/positioning system to comprise a motorized pinch roller system in which the pinch roller is positioned above and in close contact with the CD disk, and there is a pinch roller motor separate from the cutter motor and separate from the vacuum motor.

In a preferred embodiment, the motorized pinch roller system further comprises a brush disposed above the pinch roller with the brushing end contacting the pinch roller.

A particularly preferred embodiment of the invention provides for shaping and positioning a flake-capturing screen under the cutter and close to the cutter without contacting the cutter and also under the CD disk support, and to completely block access by flakes to the vacuum dust collection bag.

SUMMARY OF THE DRAWINGS

FIG. 9 is a front view of the mechanism of FIGS. 4, 5 and 6 removed from the cabinet.

DETAILED DESCRIPTION OF THE PREFERRED EMBODIMENTS

Figure 1:
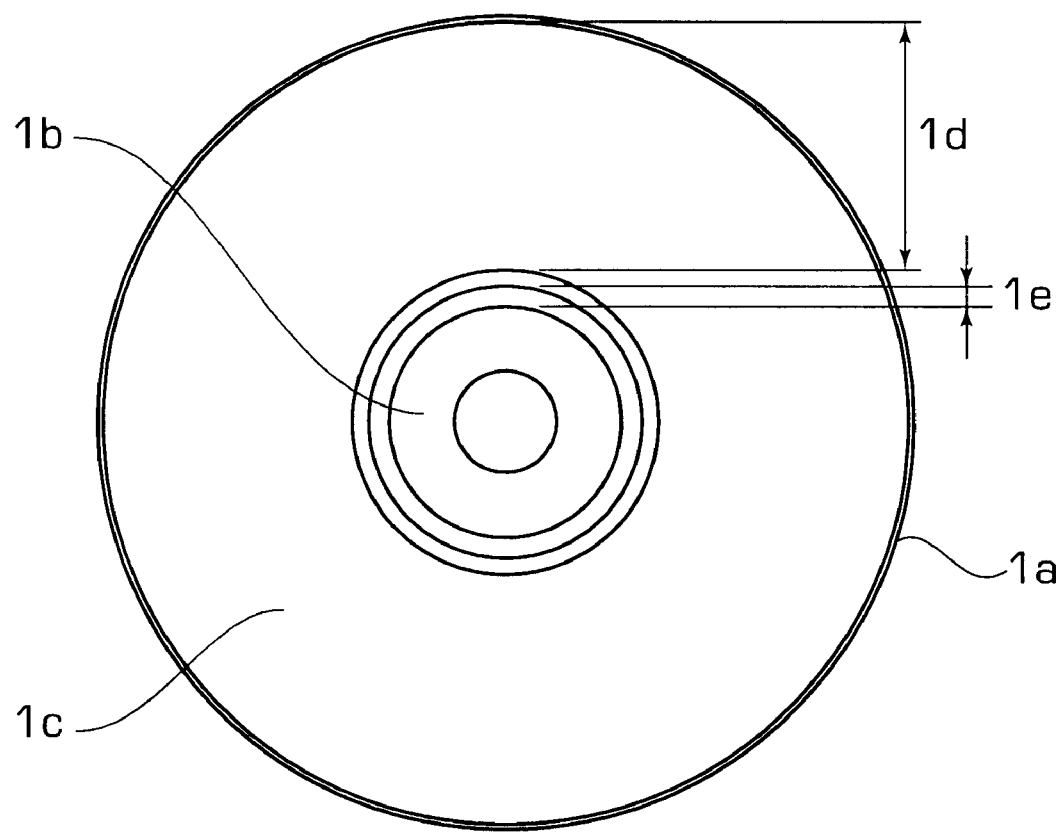
FIG. 1 is a top view of a standard CD showing the respective surface areas for the data area and the serial number.

Before being processed according to the invention, a disk 1 encoded with data, referring to FIG. 1, has a circumferential edge 1*a*, a center ring 1*b*, a shiny top surface 1*c*, and a data area 1*d* under the shiny top surface 1*c*. The inner center ring 1*b* of the disk is essentially data-less, usually having a serial or control number for identifying the disk but no confidential information. About the exterior 1.52 inches of the radius of the disk, the outer band 1*d* of the disk has recorded information. Herein that data-containing part of the disk sometimes is referred to as the disk "exterior data band". Serial number area 1*e* shown in FIG. 1 is typical of where a serial number may appear on the disk.

The desired "declassifying" of the disk means that the processed disk and any remaining dust and particles meet the U.S. government NSA/DOD declassification standard.

Declassifying the disk may be accomplished in one aspect of the invention by a process in which the unprocessed disk 1 is contacted with a rotating cutter with a patterned surface.

Figure 2:
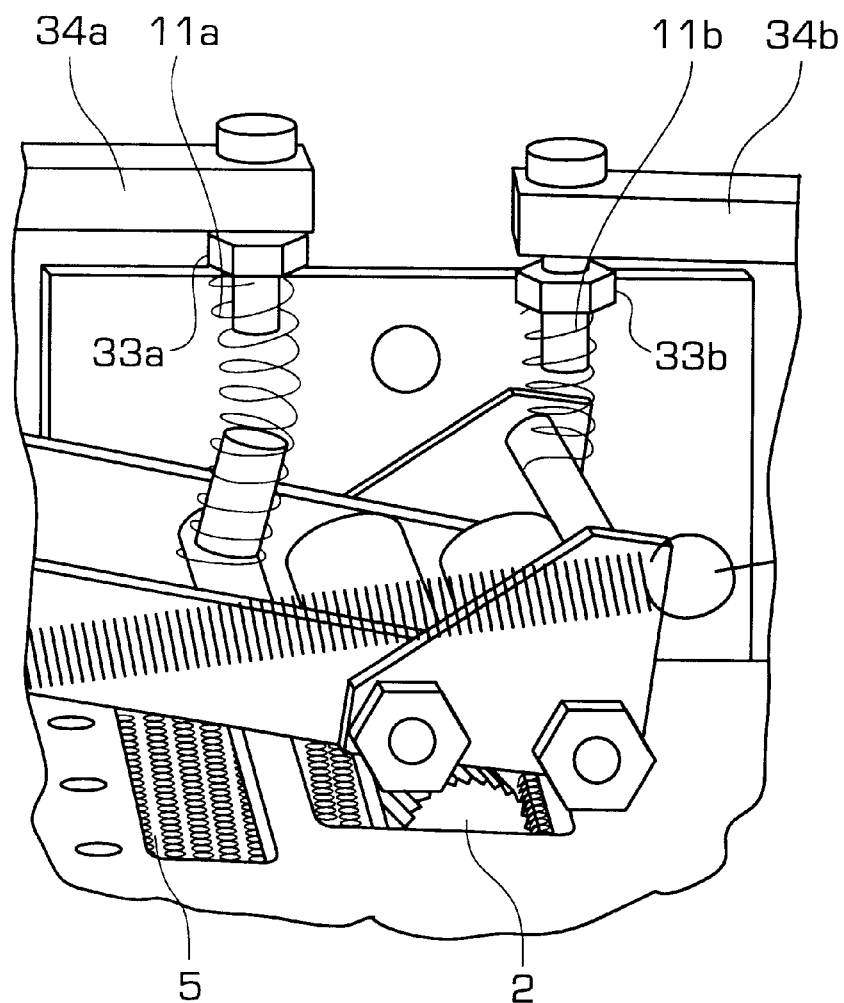
FIG. 2 shows an enlarged, partial detail view of the cutter and the parts around the cutter in a machine in which the cutter is used.
Figure 3:
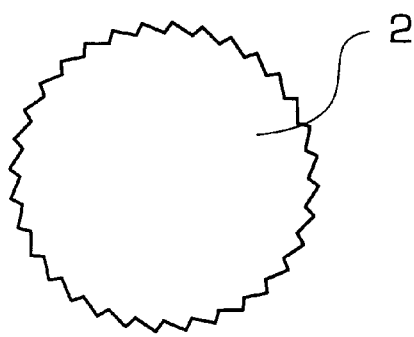
FIG. 3 is a profile view of the cutter.
Figure 4:
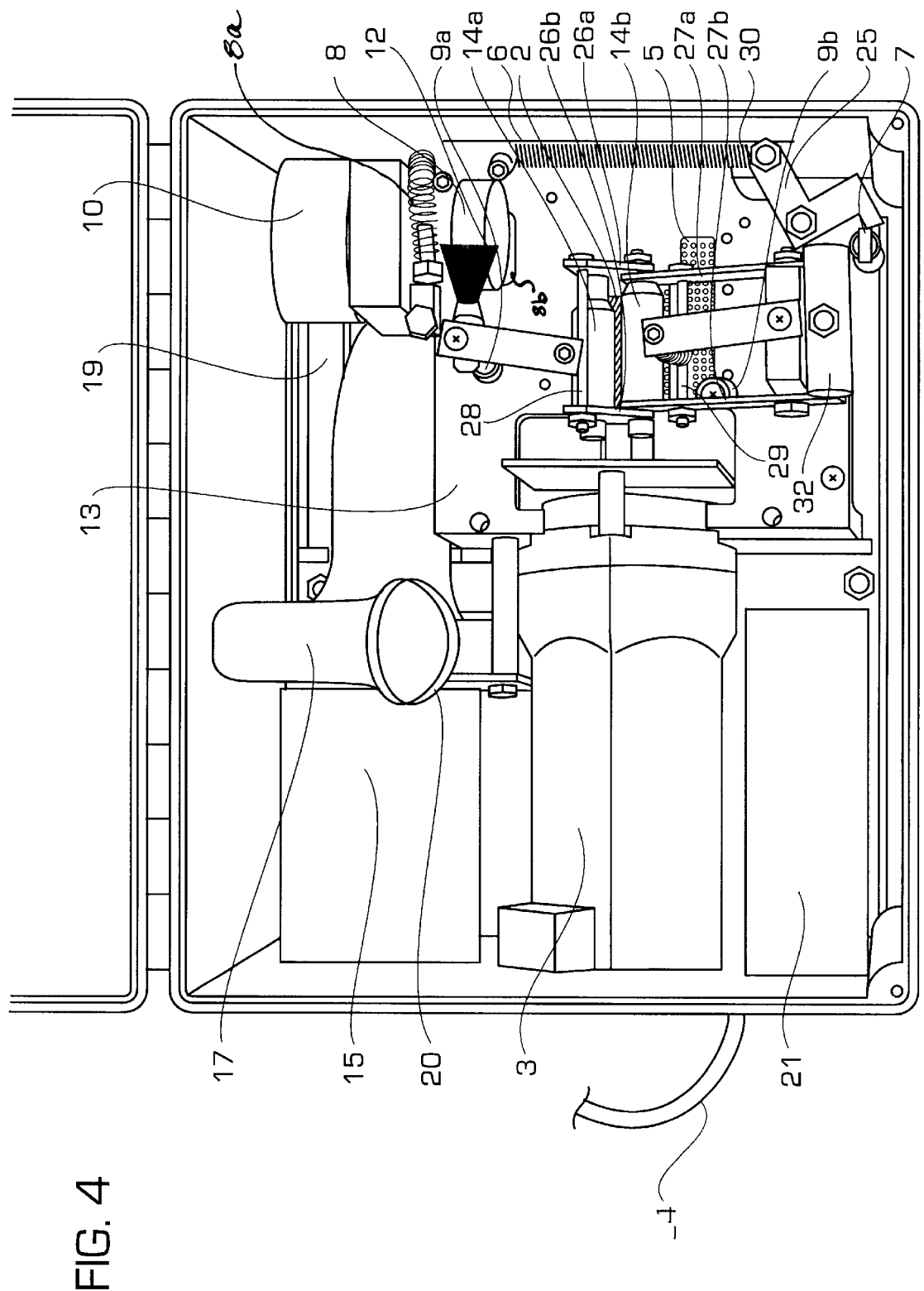
FIG. 4 is a fragmentary diagram of the interior of a partially-disassembled inventive machine in which the cutter of FIG. 2 is used and in which, for clarity of viewing, a vacuum bag is not included.

A preferred embodiment uses a cylindrical-shaped cutter, as in cutter 2 in FIGS. 2, 3, 4.

In a preferred embodiment, as shown in FIG. 4, the cutter 2 rotation is provided by a motor 3.

The cutter surface is not necessarily limited, and may be an abrasive, rotary file, herring bone, cross-cut rotary file, intersecting spiral pattern, non-cross-cut interleave file, or other pattern. For providing these surfaces, a commercially available cutter from a machinery supply house may be used. The present inventor has experimented with some of these cutters and abrasives, and has found that non-cross-cut interleave works relatively well, but because of its helical shape tends to put a side force on the disk and tends to move the disk in or out. Preferably, the cutter should not load up with dust or partially-melted residue. The most preferred embodiment uses a cross-cut herring-bone pattern for the cutter surface. Such a cross-cut herring-bone patterned cutter may be made by purchasing part no. 60469665 from Manhattan Supply Corp. and then cutting its shank down to the desired length.

The cutter length should be equal to or exceed the length of the exterior data band, i.e., about 1.52 inches. When a commercially available cutter is used, the shaft may be cut and positioned as needed to align with the radial width of the exterior data band. If the cutter length is less than radial width of the exterior data band, one in the art will easily appreciate that complications would be introduced in that data destruction may not proceed properly. If the cutter swath is too much greater than the radial width of the exterior data band, the serial number-containing center-ring undesirably may be destroyed. Having a longer-than-necessary cutter swath is to be avoided both to preserve the center-ring identification information and also to avoid unnecessary energy expenditure (and consequent heat build up) grinding a part of the disk that does not require grinding. Thus, in the most preferred embodiment, the cutter length just exceeds the radial width of the exterior data band.

As to size, the cutter diameter may be about ½ inch, but is not required to be a particular diameter.

The cutter must be positioned with respect to the disk so as to effect disk declassification. The rotating cutter must be positioned sufficiently near to the disk so that the data will be removed by the action of the rotating cutter against the disk surface.

A vacuum system may be used for forcing the disk and rotating cutter together in sufficiently close contact. "Speed" is the rate at which the cutter is rotating. The cutter typically is operated at about 10,000–30,000 rpm, which is a relatively high speed. That high-speed cutter rotation is provided by a motor. Such a grinding speed translates into a certain number of surface feet per minute. "Feed" is the rate at which the disk surface passes by the cutter.

It will further be appreciated that the cutter is rotating so as to help the disk to rotate. The cutter rotation augments the disk rotation, such that a reduced amount of force is required by the roller motor driving the disk.

At the high-speed motorized operation of the cutter, disk declassification is accomplished in as little as about 3–10 seconds.

In a preferred embodiment, the motor for driving the cutter may be run on a timing cycle. The timing cycle may be initiated by a microswitch 7 as shown in FIG. 4, which may be triggered by the to-be-processed disk.

In the declassification, the cutter must be positioned so as to come in contact with the disk surface so as, referring to FIG. 1, to mechanically remove the shiny top surface 1c and data area 1d and separate them from the inserted disk 1 being processed. The cutter is disposed in relation to the disk so that the disk center ring 1b is not ground.

The grinding operation comprises the application of the patterned cutter that is rotating to the data surface of a rotating disk.

During the grinding operation, one by-product is dust that is of a sufficiently small size to meet security declassification standards (hereinafter "dust"). The dust that is formed may be collected. Preferably, the dust is collected so that dust will not interfere with operation of moving parts.

Figure 5:
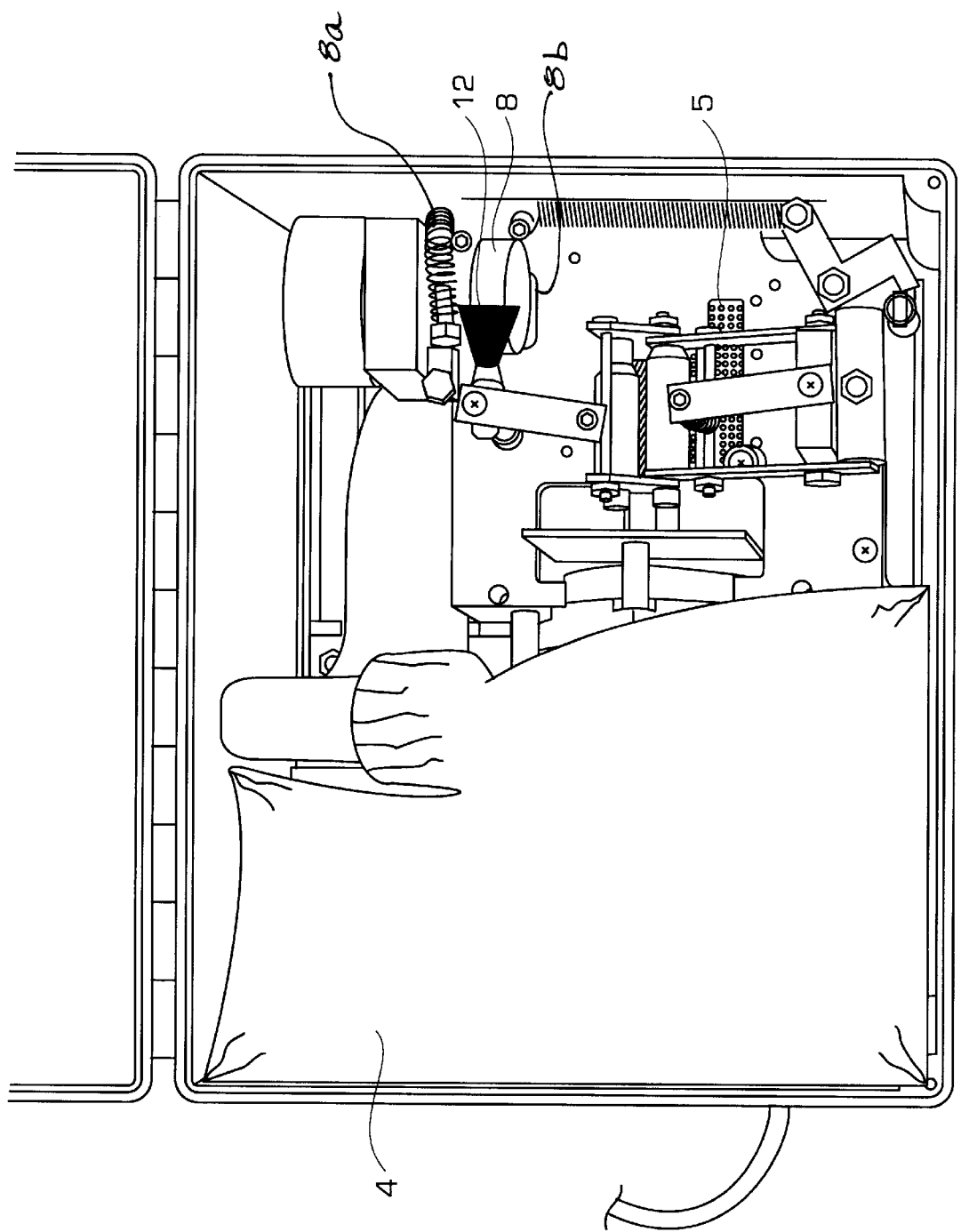
FIG. 5 is similar to FIG. 4, but with the vacuum bag added.
Figure 6:
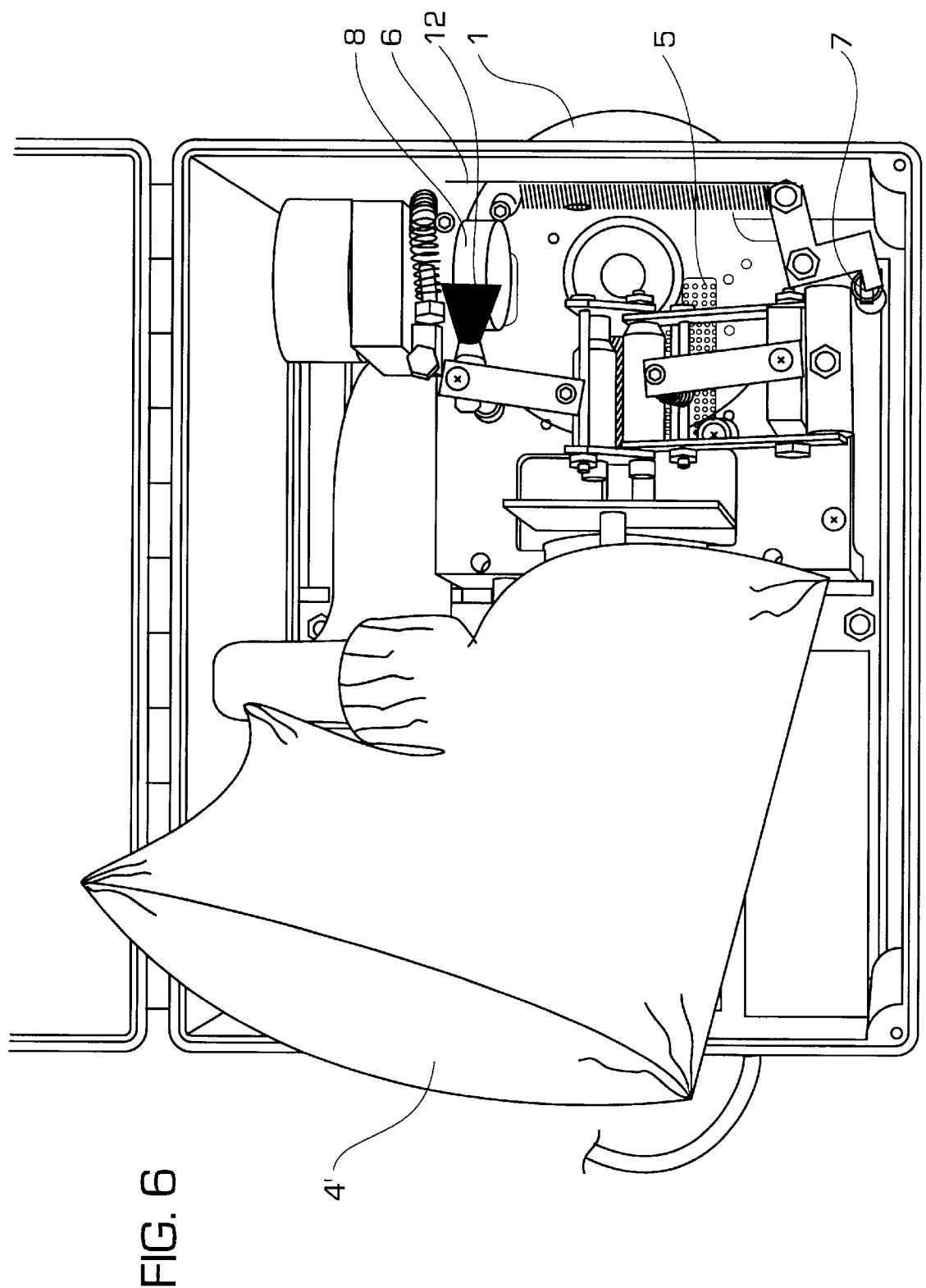
FIG. 6 is similar to FIG. 5, but with a CD inserted and the vacuum bag inflated during use of the machine.
Figure 7:
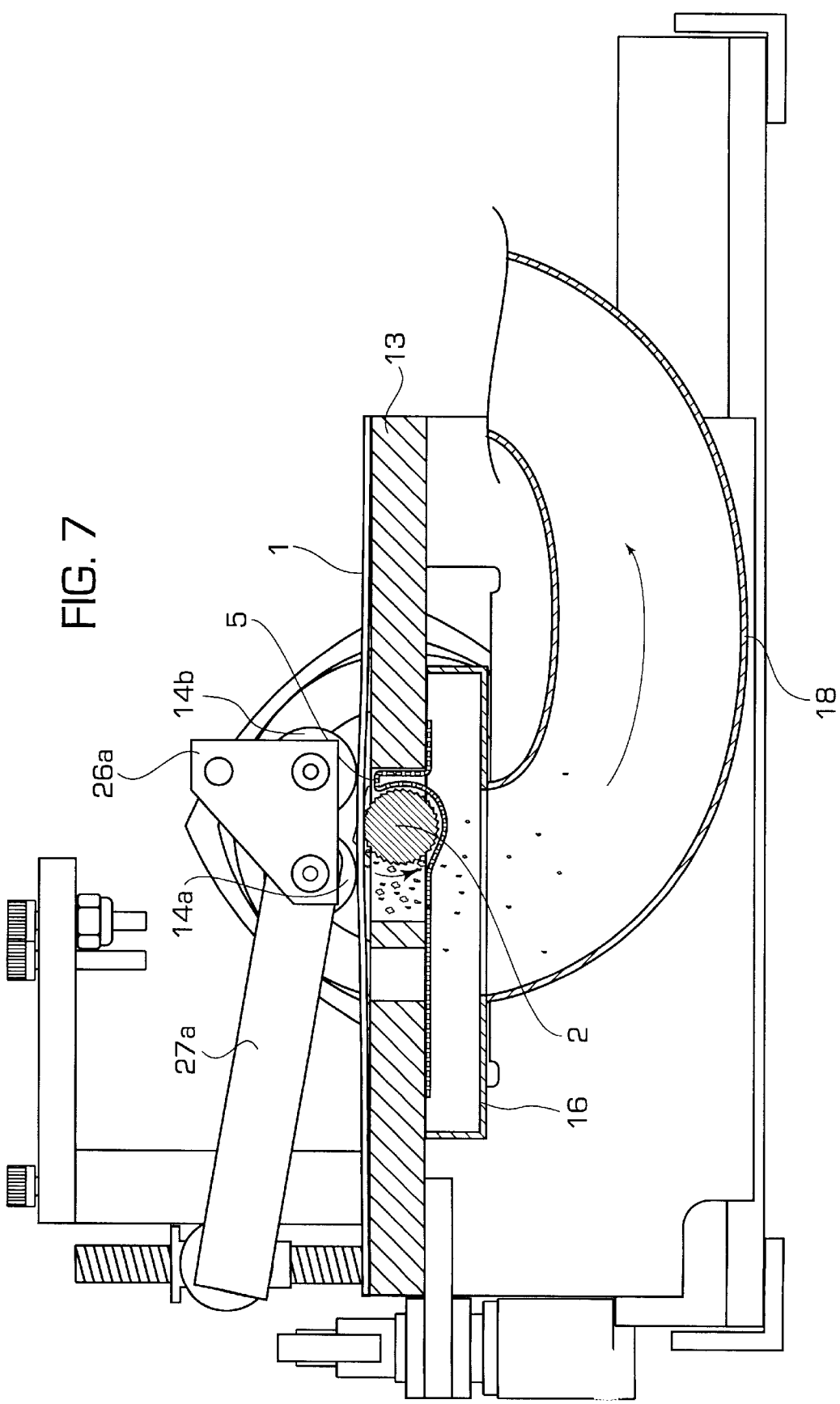
FIG. 7 shows a flake-trapping screen in relation to the cutter.

In a preferred embodiment, as shown in FIGS. 5, 6 and 7, a vacuum dust collection system is used for dust collection. The vacuum dust collection may be operated simultaneously with the grinding operation. In the machine shown in FIG. 5, the dust created from the ground data is collected in vacuum bag 4.

Optionally, the vacuum bag may be a reusable fabric vacuum pouch.

During the grinding operation, in addition to dust formation, another byproduct that may form for certain types of disks is flakes which may not meet security declassification standards (hereinafter "flakes"). Flakes that may form require capturing and further destruction efforts, i.e., regrinding. Those in the art will appreciate that only certain types of disks flake.

In a particularly preferred embodiment, importantly, the flake capturing system is as simple and integrated with the initial grinding operation as possible, so that no further parts, such as a separate regrinder, are required.

To avoid clogging and to minimize the number of parts (with the corresponding concern about either requiring close fits or separate machinery) are features of the invention. Advantageously, the present invention for its flake capturing system and regrinding, provides for reusing the precision high speed cutter.

The high speed cutter may be re-used for grinding the flakes by trapping the flakes by a carefully shaped screen.

The flake-capturing screen should have openings of sufficient size to permit the dust to pass through without clogging, but to prevent the flakes from passing. A suitable raw screen material for using is commercially available from McMaster-Carr, part no. 9360T21, which is about 0.018 inches thick. A suitable raw size for the screen is 3½ inches long by 3½ inches wide. The screen may be cut as needed.

As shown in FIG. 7, the screen 5 may be positioned around and under the rotating cutter 2 so as to capture the flakes. The screen 5 is of ordinary brass, about 0.018 inches thick, and dead soft. Holes in the screen 5 are about 0.045 inches in diameter, closely spaced. In screen 5, the "open area" (i.e., the area comprised of holes) is about 50% of the total screen area. The screen 5 is used to prevent the flakes from leaving the area of the cutter 2 prior to regrinding. Preferably, the screen 5 is disposed so that at its closest point to the cutter 2, the cutter 2 clears the screen 5 by about 0.025 inches. The rotating cutter 2 should clear the screen 5 and not contact the screen 5, to provide for smooth mechanical performance. While a maximum distance between the screen 5 and cutter 2 is not exactly established, however, it will be appreciated that providing the smallest distance possible is generally advantageous for achieving the objective of minimizing the dimensions occupied by the screen 5 and cutter 2 and associated parts. Also, the closeness of the cutter 2 to the flake-capturing screen 5 enhances the ability of the rotating cutter 5 to pick up and carry the flakes via the spaces in the cutter's patterned surface.

In a preferred embodiment, such as one as shown in FIGS. 2, 4, 5 and 6 using flake-capturing screen 5, flakes generated from the grinding of the cutter 2 against the disk surface being processed travel so that they come into contact with and situate on the rotating cutter 2. Once a flake situates on the rotating cutter 2, such as in a space on the patterned surface of the cutter, the flake travels via the rotating cutter 2 back to the contact of the rotating cutter 2 and the disk surface, and the flake is drawn between the grinding patterned cutter surface and the disk surface, and the flake is thereby reground.

It is not necessary that a flake travel on the rotating cutter 2 before regrinding. Also, flakes that have separated from the disk surface directly may be drawn back through the air, without riding on the rotating cutter 2, to the juncture of the rotating cutter 2 and the disk surface and thereby reground into dust. Some of these rather fragile flakes may also be broken down simply by coming into air-borne contact with the high-speed cutter.

The movement of the flakes in returning for regrinding between the rotating cutter 2 and disk surface may be assisted by a vacuum system, disposed to vacuum from below the screen.

Flakes that are reground into dust then travel, as dust, through the screen 5 (as does the originally ground dust).

The patterned cutting surface parallel to the disk must be kept parallel to the disk, otherwise the cutter 2 may penetrate unevenly and leave gaps of data remaining on the disk.

Also, the patterned cutting surface must be brought into sufficient contact with the disk so that all of the data will be ground off the disk.

It will be appreciated that the inventive declassification processes described herein may be modified in various ways without departing from the spirit of the invention.

In one embodiment of the invention, the declassification process may be accomplished using a single-disk machine. The operation of the machine is first set forth and discussed with reference to FIGS. 4, 6, 8(a), 9, 10 and 11.

An unprocessed disk 1 is loaded into the single-disk machine through an opening 6 to trigger a microswitch 7. A suitable microswitch for use in the invention is the "SNAP-ACTION SWITCH". Other microswitches also may be used.

Figure 8A:
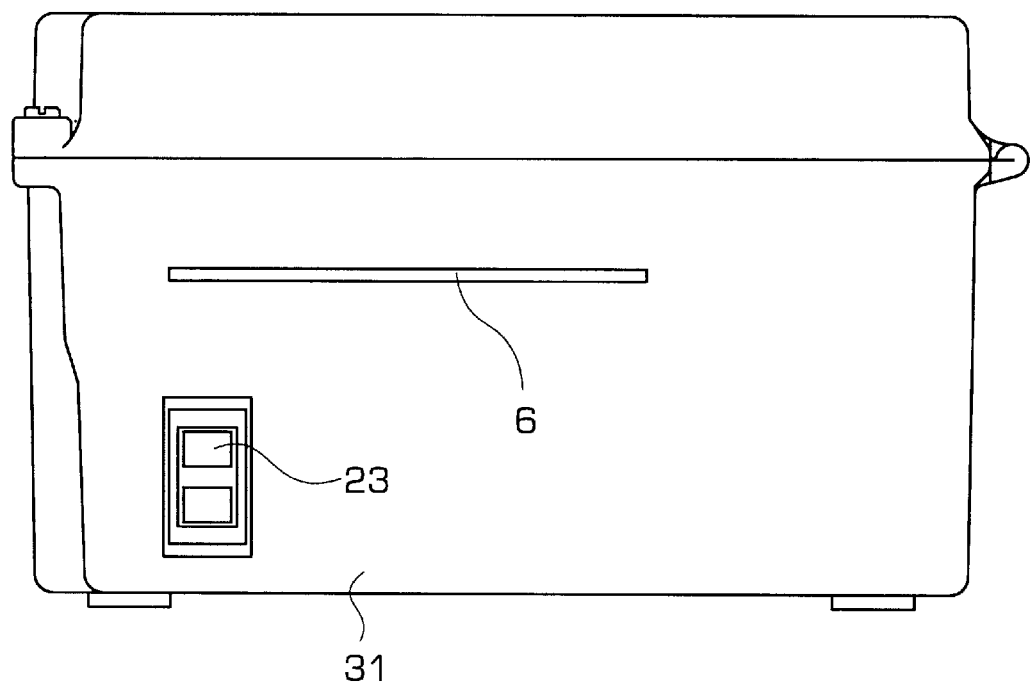
FIGS. 8(*a*) and 8(*b*) are exterior side-views of a desk-top machine according to the invention, for accomplishing high-speed, high-security disk erasure, with FIG. 8(*a*) showing the front of the machine and FIG. 8(*b*) showing the rear.
Figure 8B:
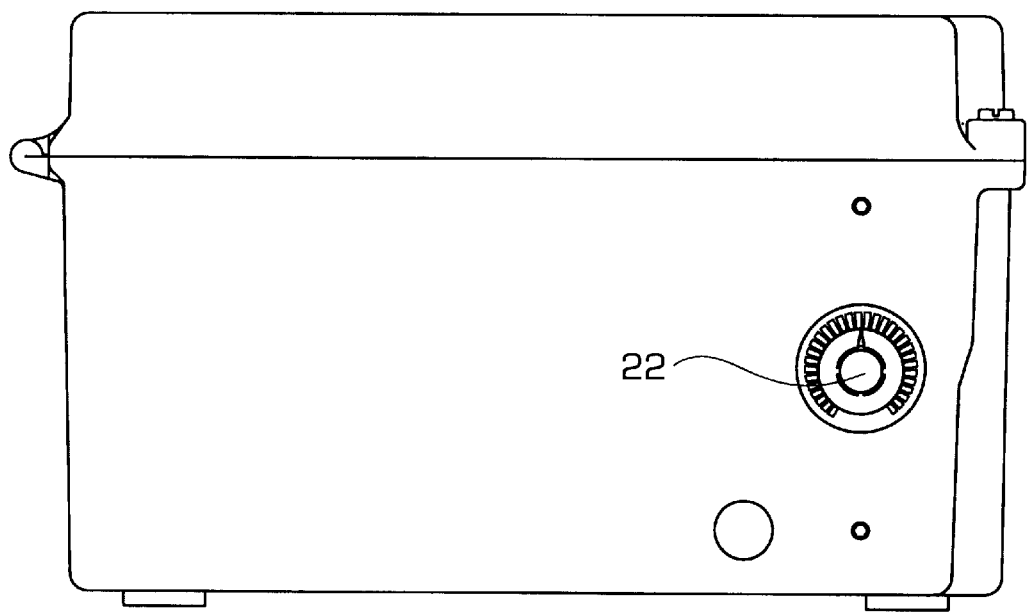
Figure 11:
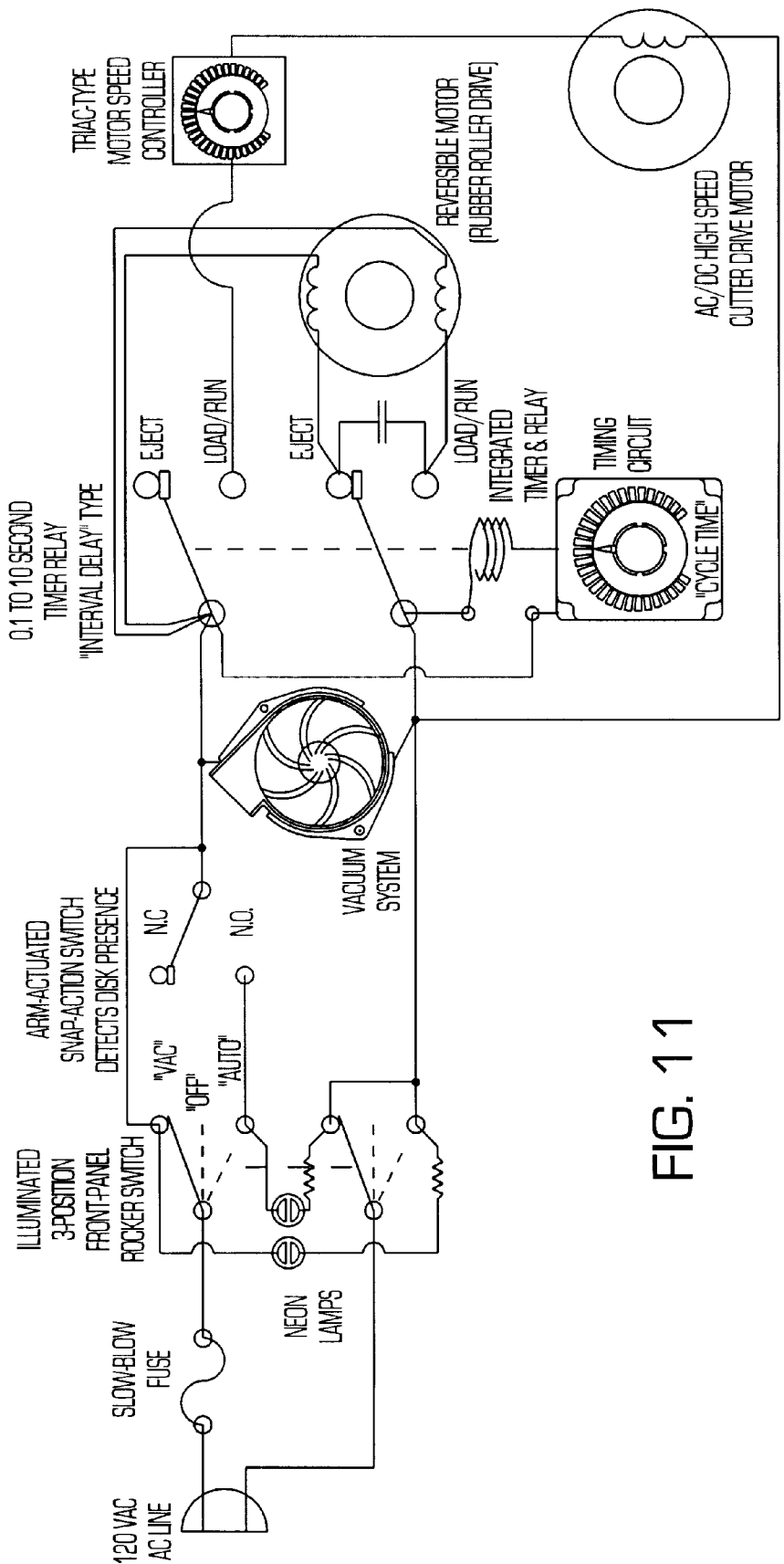
FIG. 11 is a circuit diagram.

The triggering of microswitch 7 starts a timing cycle. A circuit as shown in FIG. 11, including such a timing cycle, may be used. A timing relay 21 (shown in FIG. 4) may be used inside the machine, and the timing relay 21 may be controlled by an exterior timing knob (shown in FIG. 8(b)) on the outside of the machine.

In the preferred embodiment of the single-disk machine, the disk is drawn into the machine when a spring-loaded pinch roller mechanism, which comprises a pressure roller or pinch roller 8 riding on a big ball bearing 8b (shown on FIG. 5), pinches the inserted to-be-processed disk 1 and pulls it into the machine. The pinch mechanism is driven by a first motor 10. Thus, the roller mechanism functions first to draw the disk into the machine. Once the disk has been drawn into the machine, the roller mechanism keeps rotating the disk.

The motor 10 driving the pinch mechanism starts at the same time as a second motor 3 which drives a cutter or grinder 2. Although most simply, both motors start at the same time, such simultaneous starting of the motors is not necessary. The motors are started by switching ON the exterior on/off switch 23 (shown in FIG. 8(a)) and inserting a disk. Power is supplied via power cord 24 (shown in FIG. 4).

The pinch roller/motor combination mentioned above and shown in the figures has three functions using one mechanism: (1) to draw the partially inserted disk into position for grinding; (2) to rotate the disk to cause the cutter/grinder to sweep the entire data band; and (3) to eject the declassified disk from the machine. These aspects of the invention are innovative and economical.

Minimizing the number of motors needed is advantageous, in several perspectives, including reducing the number of parts and thereby simplifying the machine, minimizing the weight, and minimizing the dimensions.

As part of the mechanism for capturing the inserted disk, a pivot may be provided with a non-rotating guidepost at the bottom of the pivot. The guidepost is exactly across from the center of the roller. Disk capture is facilitated by passing the guidepost.

The to-be-processed disk upon being fully inserted into the machine is positioned against ball bearings. In a preferred embodiment of the invention, as shown in FIG. 4, there are three ball bearings $9a$, $9b$ and another that is not visible in FIG. 4 and is under the actuator 25. The ball bearings $9a$, $9b$ and the third ball bearing are positioned in a triangle, with the third ball bearing positioned on a pressure arm, which captures the disc 1 to position the disc for holding and rotating. The three ball bearings define where the disc center $1b$ lines up. This machine makes use of the fact that disks necessarily are uniform and circular for operation in normal use for data retrieval devices.

Figure 10:
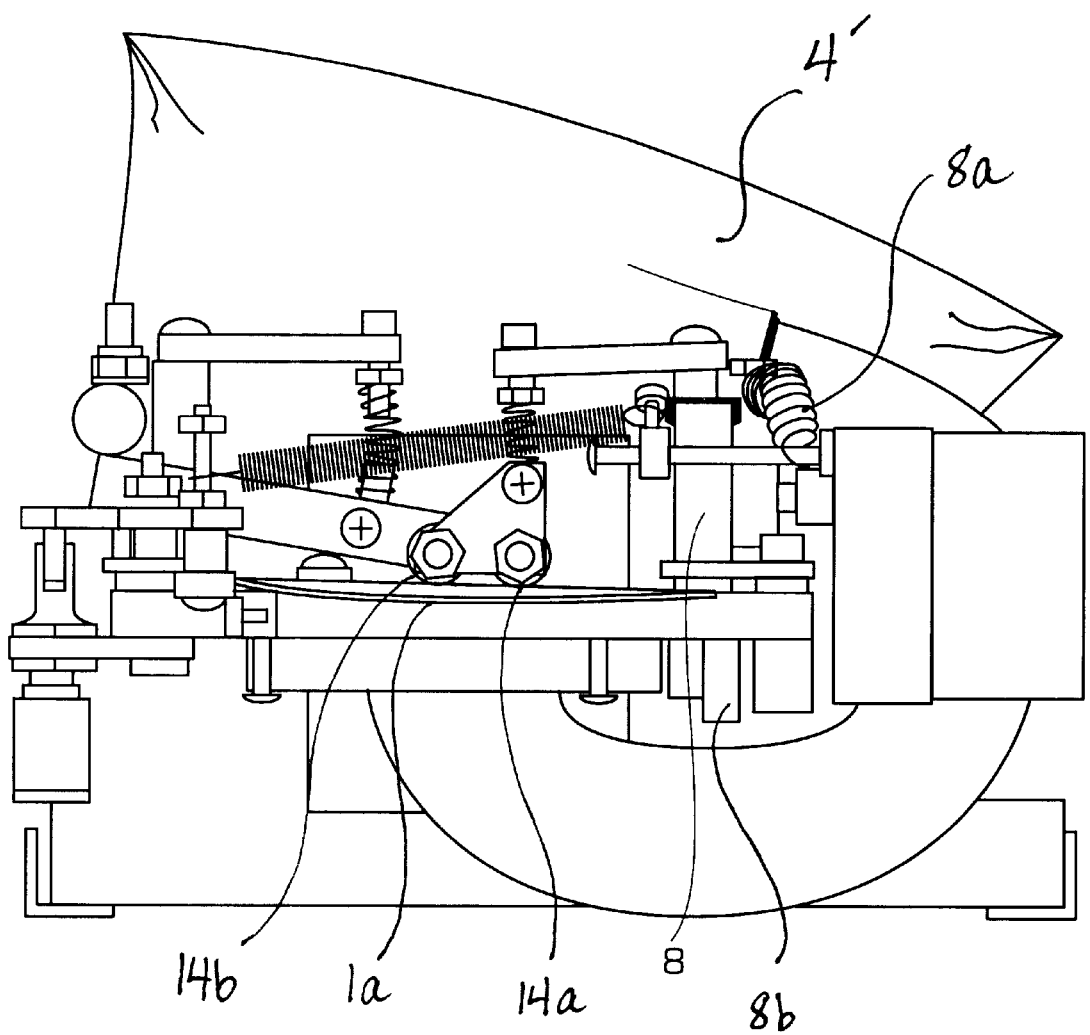
FIG. 10 is the same side view as FIG. 9, with a CD inserted and the vacuum bag inflated during use.

In the machine shown in FIGS. 9 and 10, the positioning and capturing of the disk are further accomplished by the following features. A pivot is provided, with a guidepost at the bottom of the pivot. The guidepost does not rotate and is geometrically located with the guidepost exactly across from the center of the roller. By passing the guidepost, the disk is partially captured.

In a preferred embodiment, the time cycle is set for 3 revolutions of the disk. Other numbers of revolutions, such as 1, 2, 5 or other numbers of revolutions may be used. Providing 3 revolutions is believed to be the best combination of low heat and reasonable performance. Advantageously, the user will only want the data destruction machine to run as long as necessary.

In using a machine as shown in the figures, the pinch roller 8 operates until the disk no longer remains in the machine to contact the switch actuator arm.

The ejection of the disk from the machine may be accomplished by the use of a circuit as in FIG. 11. Using that circuit, when the time cycle ends, the main (cutter) motor 3 shuts down and the roller (pinch) motor 10 reverses, and the disk exits the machine. This occurs partly because upon conclusion of the timed cycle, drag on the disk during deceleration of the grinder motor 3 makes exiting of the disk easier.

Optionally a front swing actuator arm spring 30 (shown in FIG. 4) can be set to fling the declassified disk completely out of the machine.

As set forth above, it will be appreciated that the data destruction machine may be used to have three phases of operation, including disk insertion, disk rotation for a certain time, and disk exiting.

During operation of the data destruction machine, grinding proceeds such that the shiny top surface $1c$ and data area are ground and separated from the inserted disk 1. The center ring $1b$ is not ground.

For accomplishing the grinding operation, and removing the top surface $1c$ and data area from the disk 1, the machine provides the cutter 2.

For positioning the respective parts of the machine 2 in a reduced-space configuration, two pressure springs $11a$ and $11b$ may be used, as shown in FIG. 2.

The disposition of the high-speed drive motor 3 for the cutter 2 may be accomplished by using, for attachment, a collet.

In a preferred embodiment, the whole roller motor pivots as a unit to allow for wear on the pinch roller 8 (which rotates the disk) and changes in temperature.

The workings of the pinch roller may be appreciated from FIG. 10, in which pinch roller 8 is above and contacts disk 1 under which is a ball bearing $8b$. The ball bearing freewheels during the grinding operation, and the pinch roller 8 moves. Those in the art are familiar with pinch rollers. A ball bearing was used in a preferred embodiment because it is precise and long-wearing, but alternatives may be used, such as bushings.

A brush 12 as shown in FIGS. 4, 5 and 6 is provided to brush from the pinch roller 8 dust that otherwise accumulates during operation.

For providing sufficient contact between the disk and the rotating cutter, in the embodiment shown in FIG. 7, a leading tension roller $14a$ and a following tension roller $14b$ are used for forcing the disk 1 against the rotating cutter 2. Each tension roller is floppily mounted on two independent bars $26a$ and $26b$, and $27a$ and $27b$, respectively, with an arm pivot 28 and 29, respectively, provided for each tension roller. There is a lower limit for how far down the tension rollers $14a$ and $14b$ can be pushed. The tension roller system conforms the disk to the cutter surface that it must contact, and acts as a pressure equalization/leveling device and also as the limit device. A vertical-limit-setting nut and equalizer bar are provided as part of the tension roller system.

The tension rollers $14a$ and $14b$ spin when on the disk surface. To permit such spinning, in mounting the tension roller to each arm, a loose, floppy mount is provided.

Using a tension roller assembly is preferred and provides several advantages.

First, the tension roller self-aligns to force the disk evenly against the rotating cutter. This allows for normal machine assembly without ultra-precision fits, tolerances, or adjustments.

Second, the tension roller provides a balanced downward limit. The tension roller stays parallel as it descends to the lower limit. The limit bar allows this level limiting with one part, i.e., one adjustment for the two arms.

Third, the tension roller is pushed down by a spring. The spring force is adjustable by a screw or nut. The spring position is adjustable by pivoting the spring arm mount, thus adding more or less tension roller pressure toward the center or edge of the disk as necessary.

Fourth, the use of a second tension roller helps to mold the disk, which is slightly flexible, over the cutter, enhancing cutting efficiency and speed.

Fifth, the use of the second tension roller also suppresses vibration of the disk, which otherwise could cause it to bounce away from the cutter.

A pinch force spring 8a (as shown in FIGS. 4 and 10) may be provided to apply downwards pressure to the motor frame and to increase the pressure between the pinch roller 8 and the disk.

In one embodiment, a moveable nut can be provided to decrease or increase the pressure of the pinch force spring 8a. However, in another embodiment, spring pressure may be a non-adjustable feature.

With wear, a pinch roller becomes smaller. Accordingly, being able to change pinch rollers is an advantage. The machine provided herein provides for easy replaceability of the pinch roller.

During the grinding operation, the disk sits on a support platform 13 (shown in FIG. 4) which is a flat surface.

During the grinding operation, dust is formed. The dust, being sufficiently small-sized, as shown in FIG. 7, passes through the flake-capturing screen 5 and travels in the vacuum dust collection system into a dust collection bag 4.

A vacuum system may be provided, including an intake system, a discharge system and an auxiliary system. The control system for the vacuum system may be a module.

For gathering the dust before its vacuuming, as shown in FIG. 7, a dust collector cup 16 may be provided below the screen 5, with the bottom of the cup 16 going through a hose 18 to vacuum intake (not shown on FIG. 7)

During the grinding operation, in addition to dust, flakes may be formed and require capturing. In a preferred embodiment, the flake capturing system is as simple as possible, so as to avoid the need to provide and drive a separate re-grinder, to avoid clogging, and to avoid providing more parts requiring close fits. Advantageously, the present invention for its flake capturing system and regrinding reuses the precision high speed cutter 2. The flakes get trapped by a screen 5 which is positioned under the rotating cutter 2. The screen prevents the flakes from leaving the area of the cutter 2. The flakes come into contact with and situate on the rotating cutter and thus, when that point on the cutter next contacts a disk surface, the flake is ground. Once the flakes are reground into dust, they travel as does the originally ground dust in the dust collection system into the dust collection bag 4.

In a data destruction machine such as that shown in FIG. 4, keeping the disk in cutting position is accomplished by tension rollers 14a and 14b and a balancing mechanism. When actual grinding is proceeding, the tension roller mechanism helps to keep the disk in contact with the cutting surface.

The machine configuration shown in FIGS. 2 and 4–10 addresses, inter alia, the important requirements of: keeping the cylindrical cutting surface absolutely parallel to the disk so that the cutter 2 will penetrate sufficiently and data gaps will not be left; keeping the disk in flat, direct contact with the roller line and avoiding angular contact so that data gaps will not occur; avoiding bounce problems by forcing the disk in contact with the rest of the roller, using the flexibility of the disk itself.

The machine in the embodiments mentioned above advantageously has minimal mechanisms. However, it will be easily appreciated that mechanisms can be added to the machine.

The declassified disk that exits the machine has its center ring 1b intact, but has been stripped of its shiny top surface 1c and data area. The top surface 1c and data area have been converted to dust and material consistent with security declassification standards from which data cannot be covered.

Providing a data destruction method whereby the center ring 1b remains after destruction of the data on the disk is significant. Typically, the center ring does not contain data but does contain a serial number by which the disk may be identified and controlled. Typically, security personnel responsible for controlling a disk on which was contained sensitive data will want to be able to have direct evidence that the particular disk with the particular serial number in question has been declassified.

In a preferred embodiment, an optional, detachable vacuum attachment is provided, for vacuuming from inside the machine dust that may have accumulated. During vacuuming using the optional vacuum accessory, the cutter is not operating. The optional vacuum accessory may make use of the vacuum system that already is provided as part of the vacuum dust-collection system. The optional on-board vacuum connection may include a hose and a small nozzle adapter. The life and proper mechanical functioning of the declassification machine may be enhanced by such optional further vacuuming.

Also as to dust control, filters may be provided for the motors (such as the cutter motor) used in a declassification machine according to the invention, by providing filters over the air inlets of the motors, to prevent dust from entering the motor.

The invention provides for at least one disk to be inserted into a declassification machine. It will be appreciated that two or more discs may be loaded simultaneously, using multi-disk loading technology, including an auto-loader and unloader accessory.

When using a machine where the cutter is provided below the CD disk being declassified, it will be appreciated that the disk should be inserted data-side down into the machine, so that the data surface may be mechanically ground. The declassification machine (referring to FIG. 8(a)) may be switched on using the on/off switch 23 before, as or after a disk is inserted into the opening 6.

The power requirements of a machine in which the cutter motor 3, vacuum motor 15 and pinch roller motor 10 (in FIG. 4) as mentioned above are used is 100–130 vac 60 Hz, 3.7 amperes/445 watts, which provides relatively low power consumption. The declassification machine is pluggable into a wall outlet. Also, an emergency DC converter accessory may be provided to run on a 75 ampere-hour vehicle battery. In such a case, approximately 1900 disks may be declassified on a fully charged 75 ampere-hour vehicle battery.

The motorized declassification machine and method are power-failure safe, in that in the event of loss of electrical power, the disk can be pulled out manually.

The declassification method according to the invention is simple to use for an unskilled operator, even under high stress conditions.

The sound level may be about 83 dB, A Scale, at 24 inches from the front disk slot (in a worst case position), which is comparable in sound level to a small vacuum cleaner. Such a sound level is quiet enough for an office environment.

The declassification methods and machines according to the invention are environmental, in making a cool powder that is thought to be harmless, and is easily discarded or emptied. High temperatures are not used.

A declassification machine according to the invention is simple to use, like a CD player. Opening doors or drawers is not needed. Pushing buttons is not needed. Operating latches, catches, levers, hasps or the like is not needed. A machine according to the invention does not provide exposed moving parts.

A declassification machine according to the invention is fully automatic and may be easily turned on for use, and the disk to be declassified inserted. The machine may be left on indefinitely or accidentally, and only the neon pilot light remains on.

A machine according to the invention also advantageously ejects the disk and turns itself off.

In making a declassification machine according to the invention, in a preferred embodiment, the size and weight of the machine are minimized as much as possible. To accomplish such minimization, and to minimize the size and weight of a high-speed CD-disk declassification motorized machine to as small as about 8 inches by 10 inches by 12 inches and as light as about 17 pounds, while still providing a machine that outputs a verifiable center-ring-intact declassified CD disk, production may proceed as follows, with reference to FIGS. 4, 6, 8(*a*).

As shown in FIG. 8(*a*), a housing 31 of about 8 inches high, with a base of about 10 by 12 inches, may be provided. The housing 31 may be an NEMA 4X Fiberglass sculptured, gasketed enclosure. An opening 6 into which a CD disk may be inserted is provided on a side of the housing.

Reference may be made to FIG. 4 for an example of how parts of the CD declassification machine may be disposed.

More particularly, in the housing interior, a system for capturing and positioning a CD disk is securely disposed, such that the capturing/positioning system is secured to the housing base.

To the capturing/positioning system is mechanically connected a system for disposing a patterned-surface cutter 2 of length about 1.52 inches, with the cutter parallel to and below where the CD disk will be held by the capturing/positioning system for grinding, with the cutter length aligned with the CD radius.

To the cutter 2, a motor 3 is connected for rotating the cutter at 10,000–30,000 rpm.

To the cutter motor 3, a power cord 24 is connected for establishing connection to an external power source, such as for plugging into a wall outlet.

The CD disk capturing/positioning system may comprise a support platform 13 of about 6 inches wide by 5½ inches long for supporting the CD disk during high-speeding grinding. The disk support platform 13 has a cut-out section (as seen with reference to FIG. 7) for the cutter 2 under the disk to contact the CD disk data surface. Preferably the size of the cut-out section in the support platform 13 is minimized to be no greater than needed for the rotating cutter 2 to contact the disk surface. The disk support platform 13 in FIG. 4 is secured to the housing using support frame 19.

A microswitch system is included in the declassification machine shown in the figures, and comprises a microswitch 7 actuated by actuator arm 25 positioned (as in FIG. 6) with respect to the opening 6 into which the CD disk is inserted to detect entry of a CD disk into the housing.

The microswitch 7 is electrically connected to a timing circuit, and the timing circuitry is disposed in the housing interior.

In the inventive declassification machine shown, a motorized vacuum dust collection system is disposed in the housing interior. The motorized vacuum dust collection system comprises a vacuum motor 15 separate from the cutter motor 3.

The motorized vacuum dust collection system comprises a dust collection bag 4 (as shown in FIG. 5 when the machine is not operating and in FIG. 6 when the machine is operating) connected (with reference to FIG. 4) to a vacuum exhaust 17. The vacuum exhaust is connected to a vacuuming device directed to vacuum dust from where the cutter 2 contacts the CD disk. The vacuum bag 4 in a preferred embodiment slips tightly onto a tapered rubber nipple 20 at the vacuum intake 17.

The capturing/positioning system may be made using a motorized pinch roller system. The pinch roller 8 (with reference to FIG. 4) is positioned above and in close contact with the CD disk. A motor 10 separate from the cutter motor 3 and separate from the vacuum motor 15 is provided for operating the pinch roller.

For minimizing dust on the pinch roller 8, a brush 12 is disposed above the pinch roller 8 with the brushing end contacting the pinch roller 8.

A flake-capturing screen 5 is shaped and positioned under the cutter 2 and close to the cutter without contacting the cutter and also under the CD disk support, and to completely block access by flakes to the vacuum intake.

For positioning the respective parts in a reduced-space configuration, two pressure springs 11*a* and 11*b* (as shown in FIG. 2) may be used in the disk positioning system.

In a preferred embodiment, all rotating components are disposed on permanently sealed, high-quality ball bearings.

Figure 12:
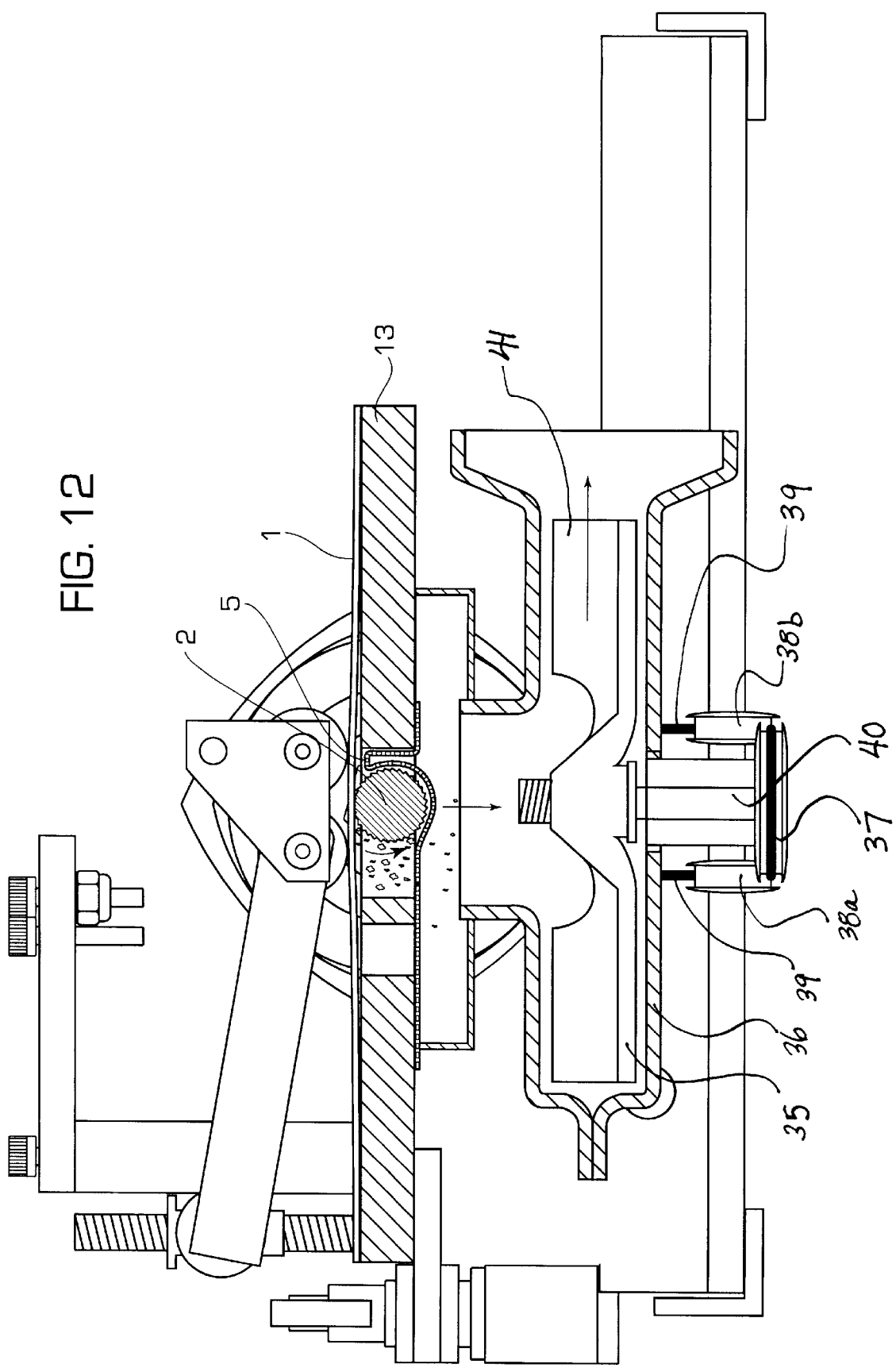
FIG. 12 shows a vacuum belt drive system in which a single motor drives both the cutter and the vacuum system.

In a preferred embodiment of a machine according to the invention, as shown in FIG. 12, the vacuum system is driven from the main grinder motor, to provide a two-motor declassification machine. Advantageously, such a system reduces the number of separate motors needed.

In such an embodiment, the cutter motor drives the vacuum impeller 35 (referring to FIG. 12), which essentially is a centrifugal fan. The impeller 35 is in the impeller housing 36. The vacuum system is mounted below the main support platform 13, with the shaft axis vertical. A pulley (not shown in FIG. 12) is provided on the main grinder motor. A pulley 37 is provided on the vacuum impeller shaft 40. Two additional pulleys 38*a* and 38*b* are mounted on the frame to allow the belt 39 to turn the corner and couple the motor pulley (not shown) to the vacuum impeller pulley 37. Pulley diameters are sized to provide the vacuum impeller speed needed. Collected dust travels through a hose 41 and up to a bag (not shown in FIG. 12). Such a two-motor machine, by eliminating a third, separate vacuum motor, further reduces weight, cost, noise, power consumption and heat buildup within the housing. A two-motor machine according to this embodiment may be lighter than 17 pounds.

In another embodiment of a two-motor machine, the vacuum system is positioned close to the front disk slot, so that the impeller shaft pulley can be driven by a belt directly from the main motor shaft. A vacuum collection cup is provided, with a hose from the vacuum collection cup to the vacuum intake. The dust travels in the vacuum exhaust to a collection bag, as in the three-motor machine mentioned above.

An autoloader may be provided for feeding disks into the declassification machine.

INVENTIVE EXAMPLE 1

A single-disk data declassification machine using a cylindrical herring bone cutter purchased from Manhattan Supply Corp. (part number 60469665) with shank slightly shortened was operated on 15 CD-ROM disks, 15 CD-WO disks and 15 CD-RWs at a time setting of no less than 8.5 seconds and a speed setting of approximately 20,000 rpm for each disk tested. After operation, ground CDs remained, along with dust in the micron range.

INVENTIVE EXAMPLE 1-A

The inventive machine produced residue from the CD-ROM disks containing approximately 3.2% of the total weight in oversized particles with the remaining residue being consistent with security destruction standards. Evaluation of the oversized particles revealed that, due to heat created by friction of the initial cutting action or grinding in the secondary chamber, smaller particles were melting together, forming "remelt" particles. Further evaluation of these oversized particles revealed that no data could be retrieved. The machine therefore met the U.S. government standard for the secure routine destruction of classified and sensitive CD-ROM media.

INVENTIVE EXAMPLE 1-B

The machine produced residue from CD-WO disks containing approximately 8.6% of the total weight in oversized particles with the remaining residue consistent with the security destruction standard. Evaluation of these oversized particles revealed that they consisted of "remelt" and metal foil. After further evaluation of both of the "remelt" and metal foil oversized particles, it was determined that no data could be retrieved. Therefore, the machine met U.S. government standards for the secure destruction of CD-WO media.

INVENTIVE EXAMPLE 1-C

The machine produced residue from CD-RW disks containing approximately 8.6% of the total weight in oversized particles with the remaining residue consistent with the security destruction standard. Evaluation of these oversized particles revealed that they consisted of "remelt" and metal foil. After further evaluation of both the "remelt" and metal foil oversized particles it was determined that no data could be retrieved. The machine therefore met U.S. government requirements for secure destruction of CD-RW media.

R-As a result of the testing, the machine may be characterized as "Meets DoD Standard for CD Destruction Devices".

It will be appreciated that the above information is not intended to be limiting and that modifications may be made without departing from the spirit of the invention.

What is claimed is:

1. A method for security declassification of a disk, comprising the step of:
   (a) contacting a data-containing disk with a rotating cutter having a patterned surface to provide a declassified disk,
   wherein the cutter has a length equal to or about corresponding to an exterior data ring radial length of the disk.

2. The method of claim 1, wherein a disk is declassified in as little as 3 seconds, to provide products consisting essentially of a declassified disk with intact center-ring and security-standard dust.

3. The method of claim 1, wherein the disk is held in contact with the rotating cutter entirely by a vacuum system.

4. The method of claim 1, wherein the contacting step (a) further provides dust.

5. The method of claim 1, wherein the contacting step (a) provides dust and flakes.

6. The method of claim 5, further comprising capturing the flakes.

7. The method of claim 6, wherein flake capturing comprises providing a screen disposed near the rotating patterned cutter.

8. The method of claim 6, further comprising grinding the captured flakes into dust.

9. The method of claim 8, wherein the products consist essentially of a declassified disk with an intact center ring and dust.

10. The method of claim 5, further comprising the step (b) of grinding the flakes into dust.

11. The method of claim 1, wherein the declassified disk has an intact center ring.

12. The method of claim 11, wherein the intact center ring comprises disk identifying information.

13. The method of claim 1, wherein the cutter is cylindrical shaped.

14. The method of claim 13, wherein the cutter has diameter about ½ inch.

15. The method of claim 1, wherein cutter rotation is provided by motor.

16. The method of claim 1, wherein the patterned cutter surface comprises a pattern selected from the group consisting of a rotary file, herring bone, cross-cut rotary file, intersecting spiral and non-cross-cut interleave file.

17. The method of claim 16, wherein the pattern is cross-cut herringbone.

18. The method of claim 1, wherein the rotating cutter is provided in a desk-top, portable machine pluggable into a wall outlet.

19. The method of claim 1, wherein the disk is an ordinary CD disk.

20. The method of claim 1, wherein the disk is a CDR.

21. The method of claim 1, wherein the disk is a CDRW.

22. A method for security declassification of a disk comprising the step of:
   contacting a data-containing disk with a rotating cutter having a patterned surface, wherein the cutter is operated at about 10,000–30,000 rpm.

23. The method of claim 22, wherein the cutter has a length equal to or about corresponding to an exterior data ring radial length of the disk.

24. The method of claim 23, wherein the cutter length equals the exterior data ring radial length.

25. The method of claim 22, wherein the declassified disk has an intact center ring.

26. The method of claim 22, wherein the cutter is driven by motor run on a timing cycle.

27. The method of claim 26, wherein the timing cycle is initiated by an arm-actuated microswitch.

28. The method of claim 27, wherein the microswitch is triggered by the disk before the contacting step (a).

29. A method for security declassification of a disk comprising the step of:
   contacting a data-containing disk with a rotating cutter having a patterned surface, wherein the disk is rotating while the cutter is contacting the disk; the cutter rotating along an axis perpendicular to the axis along which the disk is rotating.

30. The method of claim 29, wherein the declassified disk has an intact center ring.

31. A method for security declassification of a disk comprising the step of:
   contacting a data-containing disk for about 3–10 seconds with a rotating cutter having a patterned surface to provide a declassified disk.

32. The method of claim 31, wherein the declassified disk has an intact center ring.

33. The method of claim 31, wherein a disk is declassified in as little as 3 seconds, to provide products consisting essentially of a declassified disk with intact center-ring and security-standard dust.

34. A method for security declassification of a disk comprising the steps of:
contacting a data-containing disk with a rotating cutter having a patterned surface, wherein the contacting provides dust; and
vacuum-collecting substantially all the dust.

35. The method of claim 34, wherein the declassified disk has an intact center ring.

36. A method for security declassification of a disk comprising the steps of:
contacting a data-containing disk with a rotating cutter having a patterned surface, and
applying a vacuum system for holding the disk in contact with the rotating cutter.

37. The method of claim 36, wherein the declassified disk has an intact center ring.

38. The method of claim 36, wherein the disk is held in contact with the rotating cutter entirely by the vacuum system.

39. A method for security declassification of a disk comprising the steps of:
contacting a data-containing disk with a rotating cutter having a patterned surface, wherein the contacting provides dust;
vacuum-collecting substantially all the dust by application of a vacuum system; and applying the vacuum system for holding the disk in contact with the rotating cutter.

40. A method for security declassification of a disk, comprising the step of:
contacting a data-containing disk with a rotating cutter having a patterned surface to provide a declassified disk, disposing the rotating cutter in a desk-top, portable machine pluggable into a wall outlet, the machine measuring about 8 inches by 10 inches by 12 inches.

* * * * *